United States Patent
Ishii et al.

(10) Patent No.: US 7,079,348 B2
(45) Date of Patent: Jul. 18, 2006

(54) MAGNETIC DISK DRIVE OPERATING UNDER A LOW-PRESSURE ENVIRONMENT AND CONTROLLING THE SAME

(75) Inventors: Nobuyuki Ishii, Odawara (JP); Kazuhisa Murakami, Ninomiya (JP); Sadahiro Nishida, Odawara (JP); Takashi Takenaka, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 149 days.

(21) Appl. No.: 10/838,520

(22) Filed: May 3, 2004

(65) Prior Publication Data

US 2004/0264028 A1 Dec. 30, 2004

(30) Foreign Application Priority Data

May 13, 2003 (JP) .............................. 2003-133858

(51) Int. Cl.
*G11B 5/60* (2006.01)
(52) U.S. Cl. ....................................................... 360/75
(58) Field of Classification Search ..................... None
See application file for complete search history.

(56) References Cited

U.S. PATENT DOCUMENTS

| | | | | |
|---|---|---|---|---|
| 5,732,215 A | * | 3/1998 | Boutaghou et al. ........... 710/74 |
| 5,825,581 A | * | 10/1998 | Morita et al. ............ 360/78.04 |
| 6,011,666 A | * | 1/2000 | Wakamatsu ................... 360/69 |
| 6,067,203 A | * | 5/2000 | Ottesen et al. ................. 360/75 |
| 6,151,183 A | * | 11/2000 | Ogasawara et al. ........... 360/75 |
| 6,603,628 B1 | * | 8/2003 | Gillis et al. .................... 360/75 |
| 6,700,726 B1 | * | 3/2004 | Gillis et al. .................... 360/75 |
| 2003/0067698 A1 | * | 4/2003 | Dakroub et al. .............. 360/75 |

FOREIGN PATENT DOCUMENTS

| JP | 63048652 A | * | 3/1988 |
|---|---|---|---|
| JP | 09-245419 A | | 9/1997 |
| JP | 2002-298532 A | | 10/2002 |

* cited by examiner

*Primary Examiner*—K. Wong
*Assistant Examiner*—James L Habermehl
(74) *Attorney, Agent, or Firm*—Townsend and Townsend and Crew LLP

(57) ABSTRACT

A magnetic disk drive has an external environment monitoring function. Data is stored on available disk media while the magnetic disk drive is in an unfavorable environment. Under favorable conditions, the data is then moved to a write-restricted area of the media, which was unavailable while the magnetic disk drive was in the unfavorable environment. The magnetic disk drive uses a temperature sensor/atmospheric pressure sensor as a monitoring device and exercises a function, for example, for reading a reference signal stored in a predetermined area of the medium at predefined intervals. When the external environment is favorable for the magnetic disk drive, the present invention can increase the information storage capacity determined appropriate under the current operating conditions.

16 Claims, 5 Drawing Sheets

FIG.5

Correlation information table — 24

| Correlation information | |
|---|---|
| High-temparature, low-pressure storage address | Normal storage address |
| Address A00 | Address B00 |
| Address A01 | Address B01 |
| Address A02 | Address B02 |
| Address A03 | Address B03 |
| Address A04 | Address B04 |
| Address A05 | Address B05 |
| ... | ... |

41  42

MAGNETIC DISK DRIVE OPERATING UNDER A LOW-PRESSURE ENVIRONMENT AND CONTROLLING THE SAME

CROSS REFERENCE TO RELATED APPLICATION

This application claims priority from Japanese Application No. 2003-133858, filed May 13, 2003, the entire disclosure of which is incorporated by reference for all purposes.

BACKGROUND OF THE INVENTION

The present invention relates to a magnetic disk drive that can operate in a low-pressure environment, and more particularly to a technology for controlling a magnetic disk drive whose information storage area increases when the environment becomes favorable.

The following patent documents are referred to below by ordinal number, and are hereby incorporated by reference:
1. Japanese Patent Laid-open No. 9-245419; and
2. Japanese Patent Laid-open No. 2002-298532.

Magnetic disk drives are now used in all product fields due to the development of advanced electronic devices. For example, magnetic disk drives are now mounted in external storage devices and home personal computers and other electronic devices. These devices are used indoors. Therefore, magnetic disk drives for indoor use can be designed on the presumption that they remain stationary.

However, the operating environment surrounding magnetic disk drives is not always favorable for the magnetic disk drives. Magnetic disk drives used in notebook computers, car navigation systems, and other mobile applications are subject to keyboard input impact, vibration caused during vehicle motion, and various other severe operating conditions which must be taken into consideration.

In addition to the severe operating conditions associated with mobility, the physical environment surrounding a magnetic disk drive is not always favorable for magnetic disk drive operation. If, for example, a magnetic disk drive is mounted in a small airplane or other vehicle, the ambient pressure varies greatly. Further, users are now demanding magnetic disk drives that can operate at altitudes of more than 3000 m above sea level.

Magnetic disk drives are usually designed so that a control operation does not start to inhibit data recording when a slider, on which a magnetic head is mounted, decreases its flying height unless an atmospheric pressure decrease and a temperature increase both occur. In a high-temperature, low-pressure environment, however, the slider fails to fly steadily because it comes into contact with the magnetic disk medium that faces it.

Patent Document 1 discloses a magnetic disk drive that can continue to write data in a high temperature environment that exceeds a specified temperature range. Patent Document 2 discloses a magnetic head slider which can maintain a uniform flying height margin in varying low pressure environments.

In a magnetic disk drive that uses a rotary actuator, an actuator arm supporting a slider moves back and forth along an arcuate path over a rotating magnetic disk medium. As a result, a certain angle (yaw angle) is formed between the slider and the direction of magnetic disk medium rotation. Therefore, when the slider moves from the magnetic disk medium's inner tracks to outer ones via intermediate ones or vice versa, the slider's flying height increases at a radial position corresponding to a yaw angle of zero and decreases at the other radial positions. Typically, the slider's flying height increases at the magnetic disk medium's intermediate tracks and decreases at the inner and outer tracks.

In a low-pressure environment, the slider's flying height decreases so that the slider can potentially come into contact with the magnetic disk medium. In a high-temperature environment, the slider's flying height also decreases leading to the same possible contact with the magnetic disk medium. In a magnetic disk drive that uses a rotary actuator, the above-mentioned contact occurs at a specific radial position of the magnetic disk medium and the area affected by such potential contact cannot be used for information storage.

SUMMARY OF THE INVENTION

However, the inventors of the present invention found that the above affected area can be used for information recording provided contact caused by a high temperature or by low pressure is avoided. The above-mentioned inability to record data is due to the fact that a reproducible runout (RRO) component increase by contact is regarded as an increase in the amount of off-track so that a control circuit inhibits information recording. This particular inability to record does not mean that the affected area cannot withstand information recording as long as the slider flies without coming into contact with the magnetic disk medium. Under normal conditions, a write restriction signal is issued to inhibit data recording when an RRO component increase exceeds a predetermined level.

Magnetic disk drives in which the information recording area of a magnetic disk medium is narrowed to permit operations in a high-temperature, low-pressure environment are not always exclusively used in a high-temperature or low-pressure environment. The inventors of the present invention found that such magnetic disk drives that are used under varying conditions waste the magnetic disk medium's inner tracks, outer tracks, or other areas that can be properly utilized if the external environment does not have a low pressure or a high temperature.

The inventors also found that a steady-state RRO component increase beyond a specified level corresponded to slight contact between the slider and disk medium, could achieve "contact" detection, and offered a tool that could serve as a replacement of an atmospheric pressure sensor.

According to an aspect of the invention, the magnetic disk drive monitors the external environment and, when the environment becomes favorable, is capable of moving data that was stored under an unfavorable environment to a write-restricted area, which was unavailable while the magnetic disk drive was in the unfavorable environment.

A temperature sensor or an atmospheric pressure sensor may be used as an external environment monitoring device. The functionality of a temperature sensor or other external environment monitoring device may be substituted by a function for periodically reading a reference signal stored in a predetermined area of a magnetic disk medium or a function for detecting information indicating that the magnetic disk drive is in a low-pressure, high-temperature environment. The magnetic disk drive exercises the above functions to judge whether the external environment is favorable or not.

A write-restricted area, which is conventionally unavailable under unfavorable conditions, and a write-enabled area, which can be written into even under unfavorable conditions, are both furnished. In addition, a correlation information table is provided to record the relationship between the write-restricted area and write-enabled area. Furthermore, control is exercised so as to refrain from recording data in the write-restricted area under unfavorable conditions, while allowing recorded data to be moved to the write-restricted area under favorable conditions. For example, the inner tracks or outer tracks of the magnetic disk medium may be set as a write-restricted area.

Another aspect of the present invention provides for entering information indicating an unfavorable (e.g., high-temperature and/or low-pressure) environment from the outside of the magnetic disk drive and for reading the entered information to judge whether the environment is unfavorable for the magnetic disk drive, that is, whether a high-temperature, low-pressure environment exists, and exercise the above control in accordance with the judgment result.

Another aspect of the present invention uses a car navigation system for entering information indicating an unfavorable environment (e.g., a high-temperature and/or low-pressure environment). When the current location and altitude above sea level of the magnetic disk drive, which is recognized by the car navigation system, is within a specific range, it is concluded that the magnetic disk drive is under a specific environment such as atmospheric pressure. Further, an output signal from each sensor is directly entered into the magnetic disk drive to recognize the prevalent atmospheric pressure and/or temperature and or conclude that the magnetic disk drive is within a specific atmospheric pressure and/or temperature range.

Another aspect of the present invention provides functionality for reading at specified time intervals a reference signal stored in a predetermined area of the medium, comparing the amplitude of the read signal against that of a previously read reference signal to check for an amplitude increase, and concluding, if the amplitude increase is greater than predefined, that an unfavorable environment exists.

Another aspect of the present invention provides functionality for setting a data-write-enabled area at specific temperature or atmospheric pressure unfavorable for the magnetic disk drive.

Another aspect of the present invention provides a magnetic disk drive comprising a magnetic disk medium having at least first and second areas, a spindle motor for rotating the magnetic disk medium, a magnetic head for recording information onto or playing back information recorded on the magnetic disk medium, an actuator for positioning the magnetic head over the magnetic disk medium, a base for fixing the spindle motor and the actuator, an environment (e.g., atmospheric pressure, temperature) sensing function, electronic circuitry for exchanging signals between the magnetic head and the outside, a CPU for controlling the actuator, the spindle motor, and the electronic circuitry, a cover that forms a space in conjunction with the base, and circuitry configured to selectively use the at least two areas in accordance with the environment sensed by the environment sensing function.

Another aspect of the present invention provides a magnetic disk drive comprising a magnetic disk medium, a spindle motor for rotating the magnetic disk medium, a magnetic head for recording information onto or playing back information recorded on the magnetic disk medium, an actuator for positioning the magnetic head over the magnetic disk medium, the magnetic head having a flying height over the magnetic disk medium that depends on a radial position of the slider and on a set of one or more environmental parameters, the magnetic disk medium having at least first and second distinct recordable areas, designated write-enabled and write-restricted areas; and control circuitry, responsive to a signal representing a set of one or more environmental parameters, that limits writing into the write-restricted area for at least some values of the set of environmental parameters.

Another aspect of the present invention provides a magnetic disk drive comprising a magnetic disk medium having at least first and second areas, a spindle motor for rotating the magnetic disk medium, a magnetic head for recording information onto or playing back information recorded on the magnetic disk medium, an actuator for positioning the magnetic head over the magnetic disk medium, control circuitry, coupled to the actuator and responsive to read and write signals, for controlling the actuator. The control circuitry is configured to determine whether an environmental condition exists, and (a) in response to determining that the environmental condition exists, to prevent writing of data to the second area while allowing writing of data to the first area, and (b) in response to determining that the environmental condition does not exist, allowing writing of data to the second area.

A further understanding of the nature and advantages of the present invention may be realized by reference to the remaining portions of the specification and the drawings.

BRIEF DESCRIPTION OF THE DRAWINGS

FIG. 5 shows a typical configuration of a correlation information table; and

DESCRIPTION OF SPECIFIC EMBODIMENTS

Figure 1:
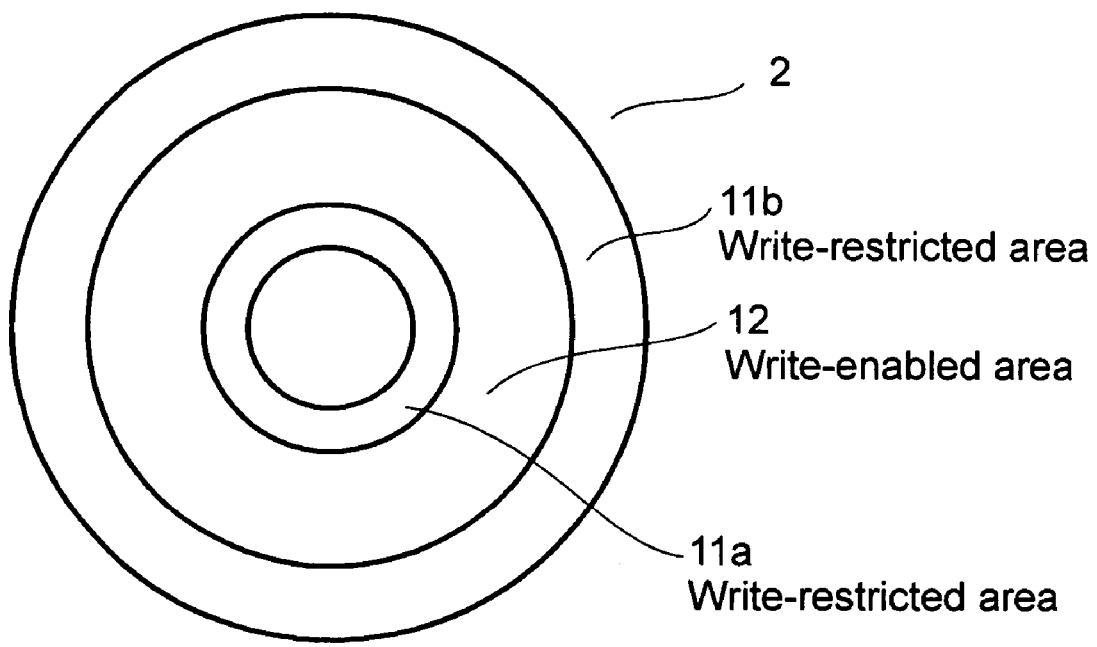
FIG. 1 is a top view illustrating an example of a magnetic disk medium according to the present invention.

FIG. 1 is a top view illustrating an example of a magnetic disk medium 2 according to the present invention. From inner to outer areas, one medium surface of a single magnetic disk medium is provided concentrically with a write-restricted area 11a, a write-enabled area 12, and a write-restricted area 11b. The boundaries of these areas are predefined.

Figure 2:
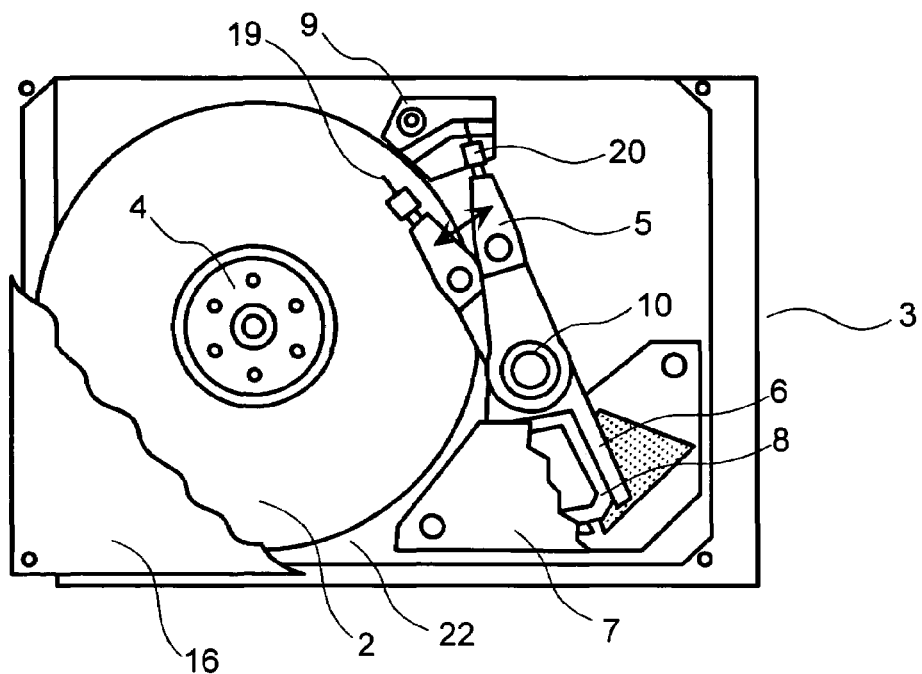
FIG. 2 is a diagram illustrating a magnetic disk drive.

FIG. 2 is a diagram illustrating a magnetic disk drive. The magnetic disk drive 3 comprises a magnetic disk medium 2, a magnetic head 20, a spindle motor 4, a carriage 6, and other mechanical components. The magnetic head 20 for reading and writing data and the magnetic disk medium 2 for recording data are the major components of the magnetic disk drive. An electronic circuit board is mounted on the back surface of a base 22. The electronic circuit board may alternatively be mounted inside the magnetic disk drive 3.

When the spindle motor 4 rotates the magnetic disk medium 2 and places it in a steady-state rotation state, an air current that is produced by a rotating magnetic disk medium over the surface of the magnetic disk medium 2 causes the magnetic head 20 to fly at a fixed height. Since the magnetic head 20 is slightly apart from the magnetic disk medium 2, they do not harm each other even if they face each other and travel at a relative speed of several tens of meters per second.

The carriage 6 is mounted on the base 22 in such a manner that it swings on a pivot 10. An electrical current flow to a voice coil 8 causes the carriage 6 to swing in interaction with the magnetic field of a magnet 7. A head arm 5 is mounted at the end of the carriage 6. A slider (not shown) is mounted at the end of the head arm 5. The magnetic head 20 is mounted on the slider.

When the carriage 6 swings, the magnetic head 20 slides down a ramp 9, flies above the magnetic disk medium 2, which rotates, and is positioned at an arbitrary place. After being positioned in this manner, the magnetic head 20 follows a specified track (not shown) on the magnetic disk medium 2 and writes or reads data.

The slider on which the magnetic head 20 is mounted is provided with a predetermined pattern (not shown), which is on a surface facing the magnetic disk medium 2. A portion of this pattern generates a negative pressure. The pattern also has a portion for positive pressure generation. The balance of pressure produced by these portions and the balance of load that is used by the head arm 5 and other components to push the slider toward the magnetic disk medium 2 cause the slider to fly above the magnetic disk medium 2.

The flying height of the magnetic head 20 depends on the atmospheric pressure within the magnetic disk drive and the viscosity of the air. In a high-temperature environment, the viscosity of the air lowers to reduce the flying force that is received by the magnetic head 20, thereby decreasing the flying height. In a low-pressure environment, the pressure within the magnetic disk drive lowers to reduce the flying force that is received by the magnetic head 20, thereby decreasing the flying height as well.

When the flying height decreases, the magnetic head 20 starts coming into contact with the magnetic disk medium 2 so that the resulting flight is unstable. Further, such contact gives unnecessary vibration and impact to the magnetic head 20 so that the magnetic head 20 cannot readily follow a specified range of tracks on the magnetic disk medium 2. If the head is unable to follow the track with specified accuracy (off-track), the information in an adjacent track is overwritten and damaged; to avoid this, a data recording operation is inhibited (write inhibition function).

Detecting a predefined amount of off-track and inhibiting a data write is exercised not only when the atmospheric pressure lowers but also when physical impact is detected. Detecting that a steady-state reproducible runout (RRO) component has increased beyond a specified level implies that the slider is in slight contact with the magnetic disk medium or, more precisely, that the slider is brought into slight contact with the magnetic disk medium via a lubricant.

The magnetic disk drive 3 uses a rotary actuator, which swings on the pivot 10. The actuator swings to vary the yaw angle, which is the angle between the slider on which the magnetic head 20 is mounted and the tangential direction of the magnetic disk medium 2.

It is possible to determine at a design stage what radial position of the magnetic disk medium 2 corresponds to a yaw angle of zero. The magnetic disk drive is usually designed so as to provide a yaw angle of zero in an intermediate track of the magnetic disk medium 2 so that the slider's flying height remains fixed in the inner and outer tracks accessible by the magnetic disk drive. Therefore, the flying height is great in the intermediate tracks of the magnetic disk medium 2 and small in the inner and outer tracks.

Figure 3:
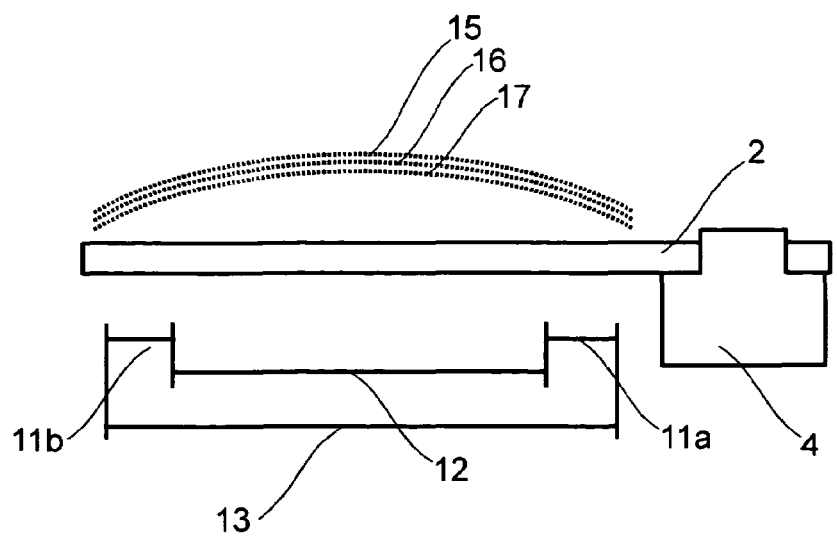
FIG. 3 is a cross-sectional view of a magnetic disk medium and a spindle motor.

FIG. 3 is a cross-sectional view of the magnetic disk medium 2 and spindle motor 4. Dotted lines are drawn to indicate a flying height profile of the magnetic head 20 relative to a radial position of the magnetic disk medium 2 with the temperature and atmospheric pressure used as parameters. Dotted line 15 represents a normal-temperature, normal-pressure environment; dotted line 16, a high-temperature, normal-pressure environment or a normal-temperature, high-pressure environment; dotted line 17, a high-temperature, low-pressure environment.

Within the magnetic disk medium 2, a predetermined innermost radial portion 11a and a predetermined outermost radial portion 11b constitute an area in which information recording is restricted (hereinafter referred to as a write-restricted area). The remaining intermediate portion 12 is an area in which information can be recorded under no restrictions (hereinafter referred to as a write-enabled area).

Figure 4:
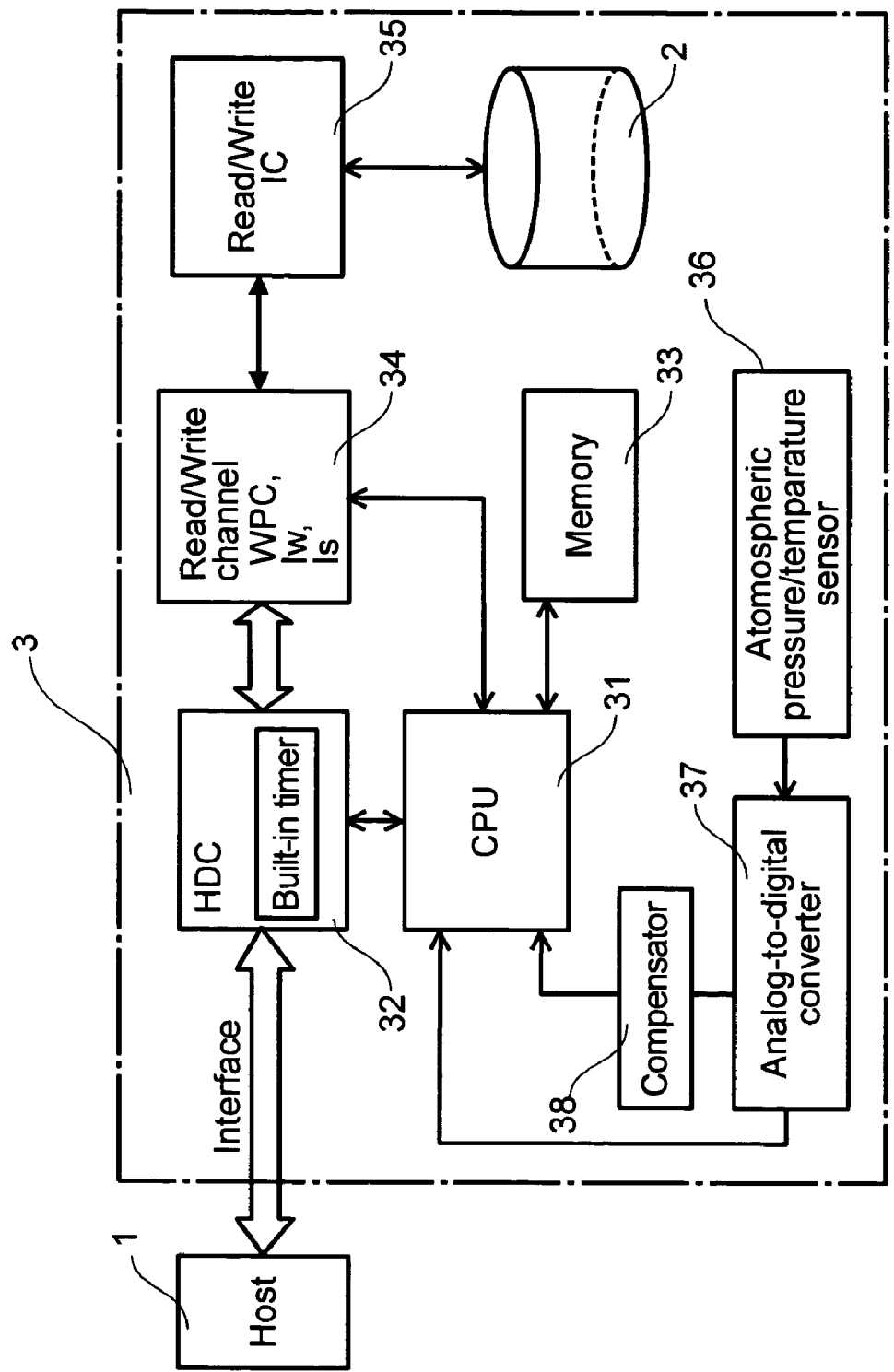
FIG. 4 is a schematic diagram illustrating a magnetic disk drive according to the present invention and an overall system to which the magnetic disk drive according to the present invention is applied.

FIG. 4 is a schematic diagram illustrating a magnetic disk drive 3 according to the present invention and an overall system to which the magnetic disk drive 3 according to the present invention is applied. The system shown in this figure includes a memory 33, uses a magnetic disk medium 2, and is connected to a host 1.

The memory 33 is a memory external to a CPU 31 of the magnetic disk drive 3. This memory 33 may be substituted by a cache memory. Further, the system has a host 1 as a higher-level device, and the magnetic disk drive 3 as an external storage device. The configuration may alternatively comprise the host 1 as a higher-level device for a large-scale computer system and the magnetic disk drive 3 as an external storage device. The magnetic disk drive 3 comprises a microprocessor 31, a hard disk controller 32, a memory 33, a read/write channel 34, a read/write IC 35, an atmospheric pressure/temperature sensor 36, and a magnetic disk medium 2 as major components, and some other mechanical components as well.

The analog output of the sensor 36 enters the CPU 31 via an analog-to-digital converter 37. A predetermined compensator circuit 38 may be positioned between the CPU 31 and the analog-to-digital converter 37. The read/write channel 34 has a function Is for supplying a predetermined DC current to the magnetic head 20, a function for supplying a predetermined write current Iw, a write pre-compensation (WPC) function for making some compensation in advance for the information to be written, and a WPC register for setting up compensator parameters.

The microprocessor 31 governs the hard disk controller 32, memory 33, and read/write channel 34, and exercises control over information exchange between the host 1 and magnetic disk medium 2 and the operation of the magnetic disk drive 3. The hard disk controller 32, which is positioned between the host 1 and magnetic disk medium 2, controls the input and output of data and commands and exercises various other control functions. The memory 33 has an area for storing data accessed by the host 1 and an area for storing a correlation information table 24 (FIG. 5), which is the management information stored on the magnetic disk medium 2.

When the host 1 is to gain access, it specifies a logical address. The magnetic disk drive 3 then converts the specified logical address into a cylinder number, head number, sector number, and other physical address values for accessing purposes.

FIG. 5 shows a typical configuration of the correlation information table 24. The information for the correlation information table 24 is stored in a management area (not shown) of the magnetic disk medium 2. It is read the moment the magnetic disk drive 3 turns on, loaded into the memory 33 (FIG. 4), and used for correlation management purposes. A correlation information table read may be performed immediately before user data is read from the magnetic disk medium 2 or immediately before data is written into a user data area (not shown). The information for the correlation information table 24 and the other management data are stored in the management area before magnetic disk drive power-off or in a predetermined time after power-on, and used upon subsequent power-on or whenever needed.

The correlation information table 24 comprises a high-temperature, low-pressure storage address section 41 and a normal storage address section 42, which correlate to each other. The high-temperature, low-pressure storage address section 41 has write-enabled area addresses at which data can be stored when a high-temperature, low-pressure external environment exists. The normal storage address section 42, on the other hand, has write-restricted area addresses to which data stored at a high temperature and at a low pressure is moved by the magnetic disk drive 3 after a high-temperature, low-pressure external environment is gone.

If, in an attempt to write data from the host 1, the magnetic disk drive 3 detects that the external environment is unfavorable for the magnetic disk drive, it writes data into a write-enabled area and stores the information about such a data write in the correlation information table 24. The magnetic disk drive 3 moves, at another opportunity, the data indicated by a high-temperature, low-pressure storage address to a write-enabled area indicated by the corresponding normal storage address. In other words, the magnetic disk drive 3 moves/rewrites the data.

In a normal-temperature, normal-pressure environment, the magnetic disk drive 3 uses the entire data surface 13 (FIG. 3) of the magnetic disk medium 2 as a read area or write area. However, if 1) the magnetic disk drive 3 is at a temperature of 60° C. or higher or the magnetic disk drive temperature equivalent of the external temperature is 60° C. or higher, or
2) the external environment has an atmospheric pressure that is prevalent at an altitude of not less than 2000 m above sea level, the magnetic disk drive 3 recognizes the innermost radial portion 11a and outermost radial portion 11b of the magnetic disk medium 2 as a write-restricted area and does not store data.

For example, the magnetic disk drive 3 allocates 15% of the whole data area to the innermost radial portion 11a and outermost radial portion 11b. The innermost and outermost radial portions 11 correspond to areas where the magnetic head 20 comes into contact with the magnetic disk medium 2 in a high-temperature, low-pressure environment.

Even in a high-temperature, low-pressure environment, a data write can be properly performed in intermediate tracks of the magnetic disk medium 2. In a high-temperature, low-pressure environment, the write-enabled area definition depends on the initial design of the flying height of the magnetic head 2, the track density provided for the magnetic disk medium 2, and the format of sectors.

Therefore, a write-enabled area and a write-restricted area may be set uniformly for each lot and each model of the magnetic disk drive 3. Further, the magnetic disk drive 3 may be exposed to a high-temperature (60° C. or higher) or a low-pressure (atmospheric pressure that is prevalent at an altitude of not less than 2000 m above sea level) environment to make measurements of each unit for setup purposes.

Figure 6:
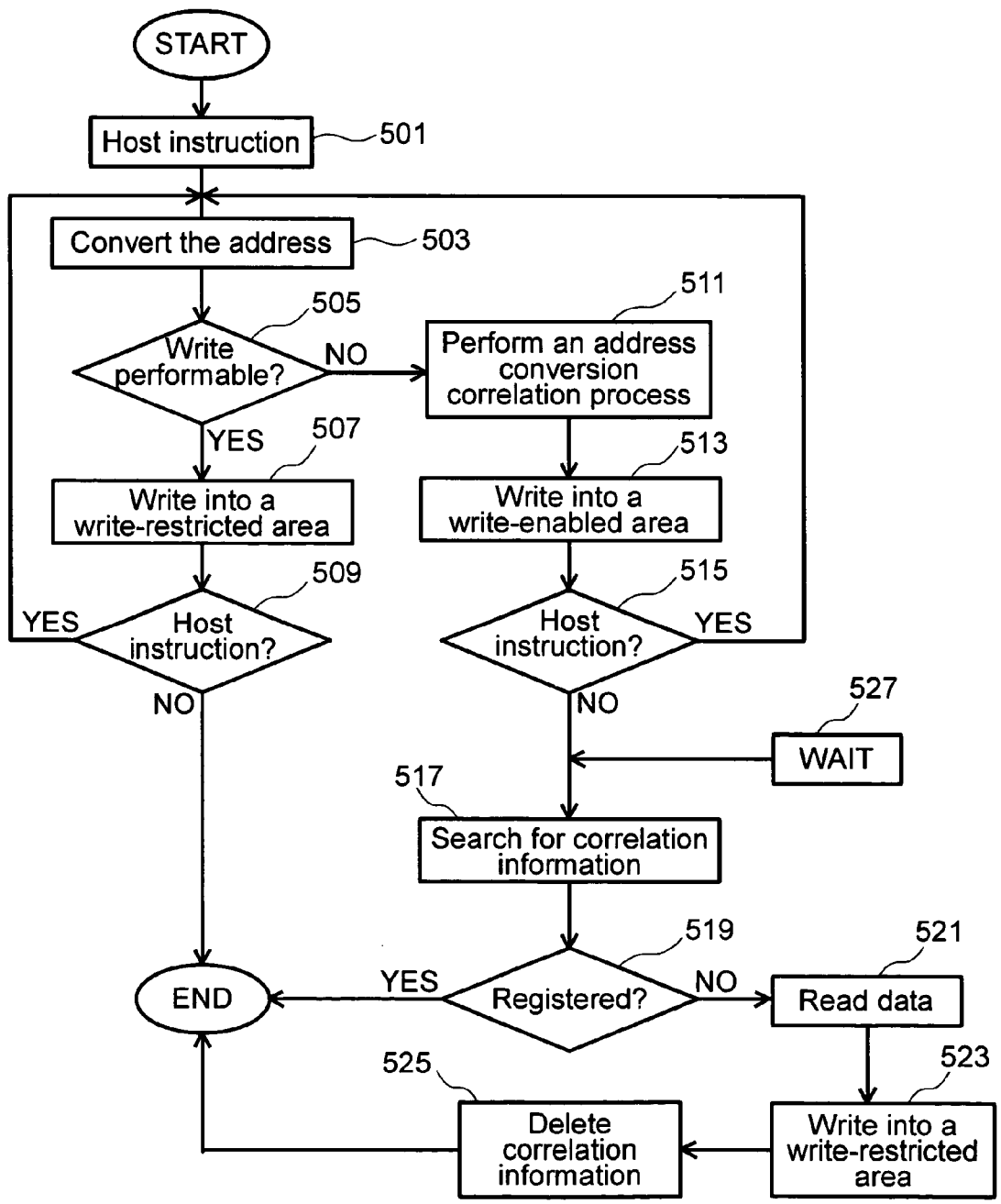
FIG. 6 is a control flowchart illustrating how a magnetic disk drive according to the present invention controls its write process.

FIG. 6 is a control flowchart illustrating how the magnetic disk drive according to the present invention controls its write process. The host 1 issues a write instruction, using a logical address, to the hard disk controller 32 via a predetermined interface (step 501). Before letting the magnetic head perform a seek to locate a target sector, the magnetic disk drive 3 converts the logical address to a physical address (step 503). If the physical address indicates a write-restricted area, the magnetic disk drive 3 causes the magnetic head to perform a seek and then attempts to perform a write (step 505). If the physical address indicates a write-enabled area, the magnetic disk drive simply has to perform a normal write process, which is not shown in the control flowchart.

If the question in step 505 is answered affirmatively, the magnetic disk drive 3 performs a write into the write-restricted area (step 507), and checks for the next instruction from the host (step 509). If the next instruction is issued, the magnetic disk drive 3 returns to step 503. If there is no more instruction, the magnetic disk drive 3 terminates the write process.

If the question in step 505 is answered negatively, the magnetic disk drive 3 converts the physical address to a physical address for a write-enabled area that is not defined in the correlation information table 24, registers their correlation in the correlation information table 24 (step 511), and performs a write into the write-enabled area (step 513). Alternatively, the magnetic disk drive 3 may register the correlation in the correlation information table 24 after the write into the write-enabled area.

The magnetic disk drive 3 checks for the next instruction from the host (step 515). If the next instruction is issued, the magnetic disk drive 3 returns to step 503. If there is no more instruction, the magnetic disk drive 3 searches the correlation information table 24 (step 517) to check for a registration (step 519). If the question in step 519 is answered affirmatively, the magnetic disk drive 3 terminates the write process. Since the question in step 519 is usually answered affirmatively and not negatively, the magnetic disk drive 3 does not proceed to step 521.

The WAIT function starts when a correlation is registered in the correlation information table 24 and the external environment has a normal atmospheric pressure. Alternatively, this function may start when a predetermined period of time elapses or when a predetermined threshold value is exceeded by the value of a signal input from the atmospheric pressure sensor.

As a direct measure, the output signal of the atmospheric pressure sensor can be monitored. However, the relevant information can alternatively be acquired from the outside of the magnetic disk drive to determine whether the atmospheric pressure is normal.

After a predetermined period of time elapses and the external atmospheric pressure is normal, a correction information search process starts to check for a correlation registration while using dummy registration information, which cannot serve as proper registration information, as an initial value (step 517).

Since there is no registration information, the question in step 519 is answered negatively so that data is read from a write-enabled area (step 521). The read data is written into a write-restricted area (step 523). The correction registration is deleted from the correlation information table 24 (step 525) to terminate the WAIT function.

Before the start of the sequence shown in FIG. 6, it is necessary that the magnetic disk drive be turned on-to effect predefined initialization.

The write-enabled area and write-restricted area definitions are usually formulated at a production stage for the magnetic disk drive 3. The definitions may be formulated uniformly for each lot and each model. Alternatively, the definitions may be formed on an individual unit basis in accordance with a signal that is output from the atmospheric pressure sensor or temperature sensor in a reduced-pressure environment.

The inability to write data due to a reduced atmospheric pressure occurs in the inner and outer tracks of the magnetic disk medium 2. The inability to write data may also occur in the other radial positions depending on the relationship to the yaw angle. An area where a write process can be performed even at a reduced atmospheric pressure should be set as a write-enabled area.

A signal from the atmospheric pressure sensor or temperature sensor and a signal from the outside of the magnetic disk drive may be used to directly detect a state where data cannot be recorded. However, if a predetermined RRO component value is exceeded, the magnetic disk drive recognizes that data cannot be recorded. Therefore, a signal corresponding to the RRO component and an off-track signal may alternatively be monitored.

When a temperature sensor and atmospheric pressure sensor are to be installed to detect the external environment temperature and atmospheric pressure, the sensor mounting positions inside and outside the magnetic disk drive must be considered. The altitude above sea level and other altitude information about the environment may be calculated from positional information, which is derived from a car navigation system or global positioning system (GPS), and used as a substitute for atmospheric pressure information.

Further, the WAIT function may be used, after the elapse of a predetermined period of time, to follow a predetermined track on the magnetic disk medium 2, compare the output signal value for a data read against a predefined output signal reference value to check for changes in the external environment, and judge whether the external environment is favorable for the magnetic disk drive.

The above is a method for making use of the fact that the playback signal amplitude of the reference signal stored on the medium increases with a decrease in the head's flying height. For example, a flying height decrease caused by a predefined threshold value such as a 15% amplitude increase or a condition unfavorable for a write may be detected. Inner or outer tracks should be followed because the flying height decreases.

When the information storage capacity set according to the external environment is more favorable for the magnetic disk drive than the predefined external environment, the present invention provides an increased information storage capacity. Since a write-restricted area and write-enabled area can be predefined, the present invention provides an extended operating environment for the magnetic disk drive. In a regular environment, the present invention can provide an information storage capacity larger than that corresponds to a write-enabled area.

While the above is a complete description of specific embodiments of the invention, the above description should not be taken as limiting the scope of the invention as defined by the claims.

What is claimed is:

1. A magnetic disk drive comprising:
   a magnetic disk medium having at least first and second areas;
   a spindle motor for rotating said magnetic disk medium;
   a magnetic head for recording information onto or playing back information recorded on said magnetic disk medium;
   an actuator for positioning said magnetic head over said magnetic disk medium;
   a base for fixing said spindle motor and said actuator;
   an environment sensor;
   electronic circuitry for exchanging signals between said magnetic head and the outside;
   a CPU for controlling said actuator, said spindle motor, and said electronic circuitry;
   a cover that forms a space in conjunction with the base; and
   circuitry configured to selectively use said at least two areas in accordance with the atmospheric pressure sensed by said environment sensor.

2. The magnetic disk drive of claim 1, wherein an off-track signal is used as an atmospheric pressure sensing function for said environment sensor.

3. The magnetic disk drive of claim 1, wherein said slider comes into contact with said magnetic disk medium in at least one of said two areas when the atmospheric pressure is low and the temperature is high.

4. The magnetic disk drive of claim 1, wherein the circuitry is configured to move data from one of said at least two areas to another one of said at least two areas to use said another one area in accordance with the atmospheric pressure sensed by said environment sensor.

5. A method for controlling a magnetic disk drive that comprises a magnetic disk medium having at least two areas, which are selectively managed by the magnetic disk drive, and an atmospheric pressure sensor, the method comprising:
   a first step of recording data in an area of said magnetic disk medium when the atmospheric pressure is low;
   a second step of recording data in another area of said magnetic disk medium when the atmospheric pressure is high; and
   a third step of moving data recorded in the first step to another area of said magnetic disk medium when the atmospheric pressure is high.

6. A magnetic disk drive comprising:
   a magnetic disk medium;
   a spindle motor for rotating said magnetic disk medium;
   a magnetic head for recording information onto or playing back information recorded on said magnetic disk medium;
   an actuator for positioning said magnetic head over said magnetic disk medium;
   said magnetic head having a flying height over said magnetic disk medium that depends on a radial position of said slider and on a set of one or more environmental parameters;
   said magnetic disk medium having at least first and second distinct recordable areas, designated write-enabled and write-restricted areas; and
   control circuitry, responsive to a signal representing a set of one or more environmental parameters, that limits writing into said write-restricted area for at least some values of said set of environmental parameters.

7. The magnetic disk drive of claim 6, wherein:
   the set of one or more environmental parameters includes atmospheric pressure; and the signal representing the set of one or more environmental parameters is uses an off-track signal.

8. The magnetic disk drive of claim 6, and further comprising a memory for storing correlation information between addresses in said write-enabled and write-restricted areas.

9. The magnetic disk drive of claim 8 wherein said control circuitry further operates to specify the transfer of data between said write-enabled and write-restricted areas using said correlation information.

10. The magnetic disk drive of claim 6, wherein:
the set of one or more environmental parameters includes atmospheric pressure; and
the signal representing the set of one or more environmental parameters is derived from a global positioning signal.

11. A magnetic disk drive comprising:
a magnetic disk medium having at least first and second areas;
a spindle motor for rotating said magnetic disk medium;
a magnetic head for recording information onto or playing back information recorded on said magnetic disk medium;
an actuator for positioning said magnetic head over said magnetic disk medium;
control circuitry, coupled to said actuator and responsive to read and write signals, for controlling said actuator, said control circuitry being configured to determine whether an environmental condition exists, and
in response to determining that the environmental condition exists, to prevent writing of data to said second area while allowing writing of data to said first area, and
in response to determining that the environmental condition does not exist, allowing writing of data to said second area.

12. The magnetic disk drive of claim 11 wherein:
when the environmental condition exists, said magnetic head has an acceptable flying height when it is positioned over said first area but does not have an acceptable flying height when it is positioned over second areas;
when the environmental condition does not exist, said magnetic head has an acceptable flying height when it is positioned over either of said first and second areas.

13. The magnetic disk drive of claim 11 wherein:
the environmental condition includes low atmospheric pressure; and
an off-track signal is used as a signal representing atmospheric pressure.

14. The magnetic disk drive of claim 11, wherein:
the environmental condition includes low atmospheric pressure; and
a signal derived from a global positioning signal is used as a signal representing atmospheric pressure.

15. The magnetic disk drive of claim 11, wherein the set of one or more environmental parameters includes temperature.

16. The magnetic disk drive of claim 11, wherein:
the environmental condition includes one or more of low atmospheric pressure and high temperature; and
the magnetic disk includes one or more of a pressure sensor and a temperature sensor.

* * * * *